US008644186B1

United States Patent
(12) United States Patent
Boers et al.

(10) Patent No.: US 8,644,186 B1
(45) Date of Patent: Feb. 4, 2014

(54) SYSTEM AND METHOD FOR DETECTING LOOPS FOR ROUTING IN A NETWORK ENVIRONMENT

(75) Inventors: Arjen Boers, Sitges (ES); Eric C. Rosen, Arlington, MA (US); Jacob Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 12/245,586

(22) Filed: Oct. 3, 2008

(51) Int. Cl.
*H04L 12/28* (2006.01)
*H04L 12/56* (2011.01)

(52) U.S. Cl.
USPC .......... 370/254; 370/392

(58) Field of Classification Search
USPC .......... 370/389, 392, 254, 401
See application file for complete search history.

(56) References Cited

U.S. PATENT DOCUMENTS 5,845,087 A 12/1998 Trehus
5,964,841 A 10/1999 Rekhter
6,219,739 B1 4/2001 Dutt
6,374,303 B1 4/2002 Armitage et al.
6,501,754 B1 * 12/2002 Ohba et al. .......... 370/389
6,512,768 B1 1/2003 Thomas
6,529,958 B1 * 3/2003 Oba et al. .......... 709/237
6,597,663 B1 7/2003 Rekhter
6,636,509 B1 10/2003 Hughes
6,879,594 B1 * 4/2005 Lee et al. .......... 370/408
6,970,464 B2 11/2005 Xu
7,339,925 B2 3/2008 O'Neill et al.
7,342,877 B1 3/2008 Ervin et al.
7,362,752 B1 4/2008 Kastenholz
7,379,426 B2 5/2008 Sekiguchi
7,388,862 B2 6/2008 Tran et al.
7,392,424 B2 6/2008 Ho et al.
7,408,911 B2 8/2008 Joshi
7,684,350 B2 * 3/2010 Raj et al. .......... 370/254
2004/0205215 A1 10/2004 Kouvelas
2005/0131912 A1 6/2005 Lin (Continued)

FOREIGN PATENT DOCUMENTS

EP 1994666 10/2007
WO WO 2007/121016 10/2007

OTHER PUBLICATIONS

EPO European Search Opinion (6 pages) and Supplemental Search Report (2 pages) mailed Mar. 10, 2010 for EP 0779743.9.

(Continued)

*Primary Examiner* — Ayaz Sheikh
*Assistant Examiner* — Hoang-Chuong Vu
(74) *Attorney, Agent, or Firm* — Patent Capital Group

(57) ABSTRACT

A method is provided in one example embodiment and includes receiving a label-mapping message at a first router. The first router does not record the label-mapping message. The method further includes sending the label mapping message toward a root router of a Multipoint Label Switched Path (MPLSP) in a network and, further, evaluating a path vector sent from the root router to identify whether a first router's address is part of the path vector. If the first router's address is present in the path vector then a label mapping associated with the path vector is not installed by the first router. In more detailed embodiments, the first router identifies that if the first router's address is part of the path vector, a loop is present in the network. If the first router's address is not part of the path vector, the label mapping associated with the path vector is recorded.

11 Claims, 2 Drawing Sheets

(56) References Cited

U.S. PATENT DOCUMENTS

| | | | | |
|---|---|---|---|---|
| 2005/0213525 | A1 | 9/2005 | Grayson | |
| 2006/0013141 | A1 | 1/2006 | Mutoh et al. | |
| 2006/0064464 | A1 | 3/2006 | Kakivaya et al. | |
| 2006/0215581 | A1 * | 9/2006 | Castagnoli | 370/254 |
| 2007/0036072 | A1 * | 2/2007 | Raj et al. | 370/225 |
| 2007/0047467 | A1 * | 3/2007 | Enoki et al. | 370/254 |
| 2007/0174483 | A1 * | 7/2007 | Raj et al. | 709/238 |
| 2007/0217420 | A1 * | 9/2007 | Raj et al. | 370/392 |
| 2007/0253416 | A1 * | 11/2007 | Raj | 370/390 |
| 2009/0161584 | A1 * | 6/2009 | Guan | 370/256 |
| 2009/0316697 | A1 | 12/2009 | Dakshinamoorthy et al. | |
| 2011/0222435 | A1 * | 9/2011 | Zou et al. | 370/254 |
| 2013/0322436 | A1 | 12/2013 | Wijnands et al. | |

OTHER PUBLICATIONS

PCT International Search Report malted May 21, 2008 for PCT/US07/64025; 1 page.

PCT International Preliminary Report on Patentability (1 page) and Written Opinion of the International Searching Authority (3 pages) mailed Sep. 16, 2008 for PCT/US07/64025.

Davie et al., "MPLS using LDP and ATM VC Switching," RFC 3035, Internet Engineering Task Force, 11 IETF Standard, Jan. 1, 2001; 21 pages; http://tools.ietf.org/html/rfc3035.

Lee, C-Y, et al., "Avoiding Loops in MPLS," draft-leecy-mpls-loop-avoidance-00.txt, IETF Standard-Working-Draft, IETF, Jun. 1, 1999; 11 pages; http://tools.ietf.org/html/draft-leecy-mpls-loop-avoidance-00.

EPO Jul. 15, 2010 Communication from EP 0779743.9; 1 page.

Jan. 25, 2011 Response to EPO Communication date Jul. 15, 2010 from EP 0779743.9; 16 pages.

Rosen, E., "Multiprotocol Label Switching Architecture," RFC 3031, IETF, Jan. 2001, 57 pages; http://tools.ietf.org/pdf/rfc3031.pdf.

Wijnands, et al., "Multicast Extensions for LDP," draft-wijnands-mpls-lsp-mcast-ext-00.txt, Network Working Group Internet Draft, IETF, Mar. 2005, 12 pages; tools.ietf.org/html/draft-wijnands-mpls-ldp-mcast-ext-00.

Minei et al., "Label Distribution Protocol Extensions for Point-to-Multipoint and Multipoint-to-Multipoint Label Switched Paths," draft-minei-wignands-mpls-ldp-p2mp-00), Network Working Group Internet Draft, IETF, Oct. 14, 2005; 19 pgs.; http://tools.ietf.org/pdf/draft-minei-wijnands-mpls-ldp-p2mp-00.pdf.

USPTO Nov. 5, 2013 Notice of Allowance from U.S. Appl. No. 13/484,606.

* cited by examiner

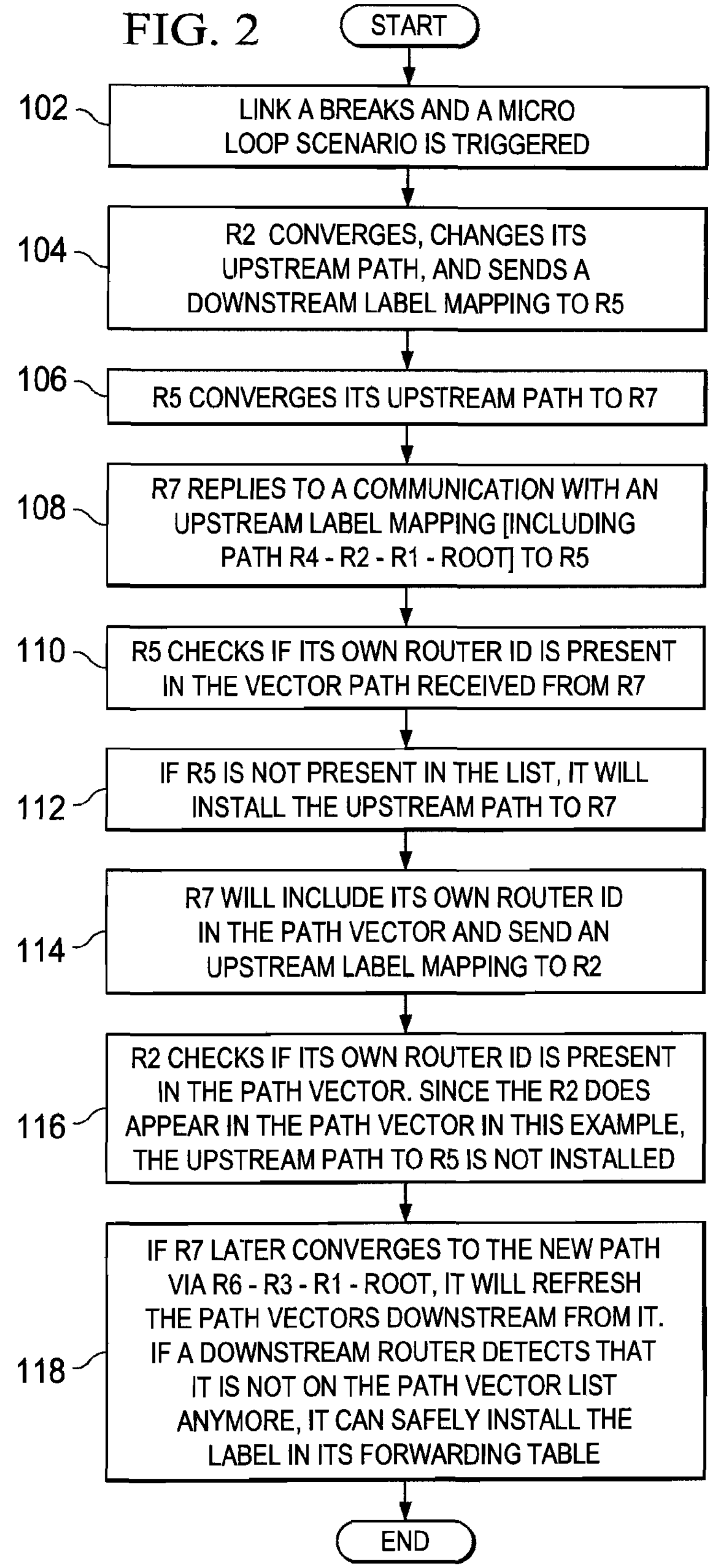
FIG. 2
START
102
LINK A BREAKS AND A MICRO LOOP SCENARIO IS TRIGGERED
104
R2 CONVERGES, CHANGES ITS UPSTREAM PATH, AND SENDS A DOWNSTREAM LABEL MAPPING TO R5
106
R5 CONVERGES ITS UPSTREAM PATH TO R7
108
R7 REPLIES TO A COMMUNICATION WITH AN UPSTREAM LABEL MAPPING [INCLUDING PATH R4 - R2 - R1 - ROOT] TO R5
110
R5 CHECKS IF ITS OWN ROUTER ID IS PRESENT IN THE VECTOR PATH RECEIVED FROM R7
112
IF R5 IS NOT PRESENT IN THE LIST, IT WILL INSTALL THE UPSTREAM PATH TO R7
114
R7 WILL INCLUDE ITS OWN ROUTER ID IN THE PATH VECTOR AND SEND AN UPSTREAM LABEL MAPPING TO R2
116
R2 CHECKS IF ITS OWN ROUTER ID IS PRESENT IN THE PATH VECTOR. SINCE THE R2 DOES APPEAR IN THE PATH VECTOR IN THIS EXAMPLE, THE UPSTREAM PATH TO R5 IS NOT INSTALLED
118
IF R7 LATER CONVERGES TO THE NEW PATH VIA R6 - R3 - R1 - ROOT, IT WILL REFRESH THE PATH VECTORS DOWNSTREAM FROM IT. IF A DOWNSTREAM ROUTER DETECTS THAT IT IS NOT ON THE PATH VECTOR LIST ANYMORE, IT CAN SAFELY INSTALL THE LABEL IN ITS FORWARDING TABLE
END

SYSTEM AND METHOD FOR DETECTING LOOPS FOR ROUTING IN A NETWORK ENVIRONMENT

TECHNICAL FIELD OF THE INVENTION

This invention relates in general to the field of communications and, more particularly, to a system and a method for detecting loops for routing in a network environment.

BACKGROUND OF THE INVENTION

Networking architectures have grown increasingly complex in communication environments. This complexity has resulted in numerous protocols being implemented to ensure that network elements are aware of their surroundings and to direct packets in an efficient manner. For example, certain network elements may exchange packets in order to provide routing path vectors and routing updates. In this manner, routers are able to become aware of their surroundings and the topology of the network for directing or managing traffic properly.

The signaling data that is passed between network elements is crucial for the effective routing of information or data. The signaling data serves as a basis for an effective synchronization between elements and, further, offers viable routing paths in the network. However, as network systems become more sophisticated, this information exchange may become problematic. In some cases, loops are created that result in packets being dropped.

Thus, the ability to offer a system or a protocol that offers an effective mapping for network elements (without hindering system speeds, creating loops, taxing processing capabilities of network components, or exchanging a large amount of data that could be irrelevant later) provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is a simplified flowchart illustrating a series of example steps associated with the communication system.

DETAILED DESCRIPTION OF EXAMPLE EMBODIMENTS

Overview

Figure 1:
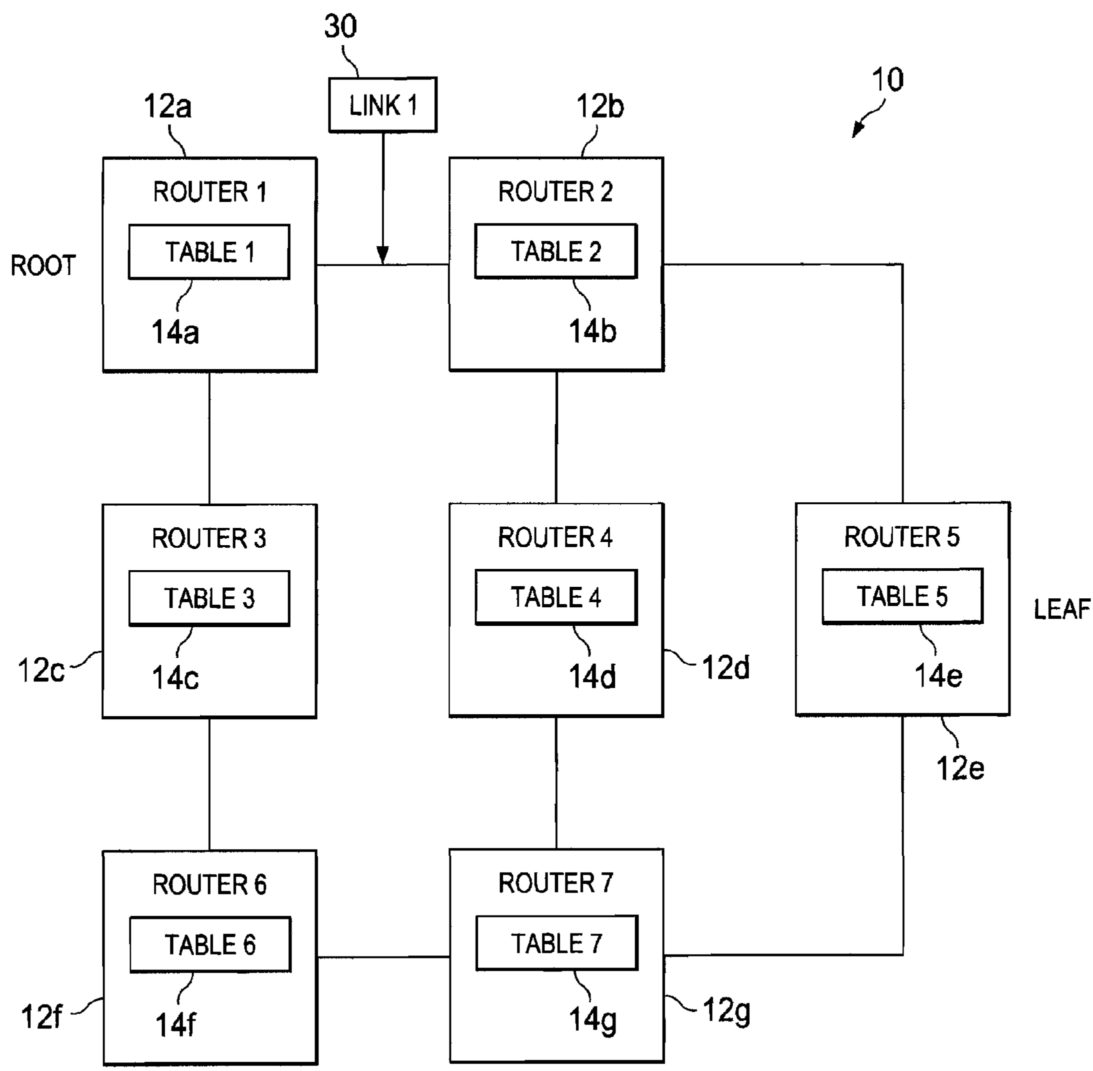
FIG. 1 is a simplified block diagram of a communication system for detecting loops in a network environment in accordance with one embodiment of the present invention.

A method is provided in one example embodiment and the method includes receiving a label-mapping message at a first router. The first router does not record the label-mapping message. The method further includes sending the label mapping message toward a root router of a Multipoint Label Switched Path (MPLSP) in a network and, further, evaluating a path vector sent from the root router to identify whether a first router's address is part of the path vector. If the first router's address is present in the path vector then a label mapping associated with the path vector is not installed by the first router. In more specific terms, the first label mapping that is received is the label mapping for the downstream path. This downstream path is not installed into forwarding until the label mapping for the upstream path is received. The upstream path is also a path that is installed into forwarding. Once the first router detects that it is not in the path vector of the label mapping for the upstream path, two forwarding entries can be programmed: the downstream path and the upstream path. Both of these entries are significant in preventing a possible loop (as detailed below).

Turning to FIG. 1, FIG. 1 is a simplified block diagram of a communication system 10 for detecting loops in a network environment. Communication system 10 may include multiple network elements such as routers 12*a*-12*g*, each of which may include a respective table 14*a*-14*g*. These network elements may also be referred to herein as routers R1-R7 respectively. The numerical designations assigned to the network elements do not connote any type of hierarchy; the designations are arbitrary and have been used for purposes of teaching only. These designations should not be construed in any way to limit their capabilities, functionalities, or applications in the potential environments that may benefit from the features of communication system 10. FIG. 1 also includes a link A 30, two leaves, and a root.

Each table 14*a-g* represents some type of database or memory that stores information associated with surrounding network elements, as well as data to be used in routing packets in the context of network communications. Additional details relating to the architecture and functionality of these elements are provided below.

FIG. 1 may be generally configured or arranged to represent any communication architecture capable of exchanging packets in a network environment. Such configurations may include, for example, first generation, 2G, 2.5G, and 3G architectures that offer packet-exchanging capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In accordance with the techniques and teachings of the present invention, communication system 10 provides a communication approach that allows routers R1-R7 to exchange information via a suitable protocol such that accurate mapping information is learned in order to route information optimally. Communication system 10 can change upstream path logic of multipoint-to-multipoint (MP2MP) label switched paths (LSPs) and add label distribution protocol (LDP) path vectors. By using the LDP path vectors, routing loops can be detected for the upstream path. In detecting the loop in the control plane, loops in the forwarding plane are thereby prevented.

Communication system 10 can further add path vectors to the multicast LDP (mLDP) upstream path label mappings of an MP2MP LSP setup. There is no additional signaling required to transport the paths vectors for MP2MP LSPs. The elimination of loops conserves bandwidth, as loops create overhead issues for the network. Furthermore, loops cause packets to be systematically dropped, which hinders effective communications.

MP2MP LSPs generally consist of two parts: a downstream path (much like a P2MP LSP) and an upstream path. Hence, the LSPs are bi-directional. This allows information from the leaves of the trees to ascend back onto the tree, as well as flow down to the leaves. The packets can go to intermediate nodes, then to the root, and then flow down to the branches of the tree. Thus, from a forwarding perspective, the downstream part is from the root down to the leaves and the upstream part is from the leaves back to the root.

mLDP builds MP2MP LSPs and these can be built based on the root address. There is a routing lookup based on the root address in this scenario in order to discover what the next hop is for forwarding purposes. These operations collectively create the MP2MP tree. Note that mLDP does not have its own routing, as it is depending on unicast routing that is available in the network. This creates an issue when one of these routing protocols (e.g., intermediate system to intermediate system (IS-IS), or Open Shortest Path First [OSPF]) is converging or being updated, as there is a chance that a loop will be created.

For example, the upstream path of an MP2MP may be subjected to a micro-loop during interior gateway protocol (IGP) convergence. The upstream path keeps injecting packets in the tree, which fans out using the P2MP part of the LSP. This scenario is worse than unicast micro-loops. If there are no micro-loops in the IGP, there are no micro-loops in MP2MP. Therefore, if the IGP can fix this issue, the problem could be solved and dismissed. However, in the case that IGP cannot provide a micro-loop free network, communication system can be applied to address this important issue. Before turning to some of the operations of this architecture, a brief discussion is provided about some of the infrastructure of FIG. 1.

R1-R7 elements (12*a*-12*g*) are routers with appropriate software to execute the described operations in an example embodiment of the present invention. As used herein in this Specification, the term 'router' is meant to encompass switches, gateways, bridges, loadbalancers, firewalls, or any other suitable device, component, element, or object operable to exchange information in a network environment. Moreover, these routers R1-R7 may include any suitable hardware, software, components, modules, interfaces, or objects that facilitate the operations thereof. This may be inclusive of appropriate algorithms and communication protocols that allow for the effective exchange of data or information.

Tables 14*a-g* may be included in their respective routers R1-R7. In other embodiments, these tables may be provided externally to routers R1-R7, or consolidated in any suitable fashion. Tables 14*a-g* are memory elements for storing information to be referenced by their corresponding routers. As used herein in this document, the term 'table' is inclusive of any suitable database or storage medium (provided in any appropriate format) that is capable of maintaining information pertinent to the routing and/or processing operations of routers R1-R7. For example, tables 14*a-g* may store such information in an electronic register, diagram, record, index, list, or queue. Alternatively, tables 14*a-g* may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

For purposes of illustrating the techniques of communication system 10, it is important to understand the somewhat esoteric communications that may be traversing the network and that provide routing information to any given network element. The following foundational information may be viewed as a basis from which the present invention may be properly explained. Such information is offered earnestly for purposes of explanation only and, accordingly, should not be construed in any way to limit the broad scope of the present invention and its potential applications.

In multiprotocol label switching (MPLS), packet headers are examined at a network's entry points, for example, at a router. Based on the packet's header and based on traffic configuration settings, the packet can be assigned a label. Once the packet passes a first router, intermediate routers can further examine the label and switch the packet based on this label. For MPLS, explicit routing is easier than with traditional routing and, further, for quality of service (QoS) architectures, MPLS labels may be used to infer the packet's precedence.

Due to the popularity of multicast operations, many architectures have responded by offering multicast support in MPLS networks. To provide multicast communications in MPLS networks, new elements are added to the MPLS architecture and some modifications/extensions are used for the existing unicast MPLS architecture.

The distribution of multicast traffic in IP networks is done using a distribution tree, which is typically constructed via multicast routing protocols. In order to distribute multicast traffic using MPLS networks, these multicast trees should be mapped to layer-two MPLS paths or LSPs. In MPLS networking, an LSP is a path through an MPLS network, set up by a signaling protocol such as LDP, RSVP-TE, or CR-LDP. The path is set up based on criteria in the forwarding equivalence class (FEC).

The path commonly begins at a label edge router (LER), which makes a decision about which label to use for a packet based on the appropriate FEC. It then forwards the packet along to the next router in the path, which swaps the packet's outer label for another label, and forwards it to the next router. The last router in the path removes the label from the packet and forwards the packet based on the header of its next layer, for example IPv4. Forwarding of packets through an LSP is somewhat opaque to higher network layers and, thus, an LSP is sometimes referred to as an MPLS tunnel.

The router that first prefixes the MPLS header to a packet is called an ingress router. The last router in an LSP, which removes the label from the packet, is called an egress router. Routers in between these ingress and egress routers, which are only tasked with swapping labels, are commonly called transit routers or label switching routers.

Note that LSPs are unidirectional; they enable a packet to be label switched through the MPLS network from one endpoint to another. Since bidirectional communication is typically desired, the aforementioned dynamic signaling protocols can set up an LSP in the other direction to compensate for this issue.

mLDP MP2MP LSPs are setup to a root node (depicted in FIG. 1) in the network following unicast routing. After a link or node failure, unicast routing will converge and calculate a new path to reach the node. During this convergence, a problem is triggered: namely, unicast routing can create temporary micro-loops. For unicast activities, this means that unicast packets are looped until the time to live (TTL) expires and the packet is dropped. For multicast, this problem is worse because the loop may also fan out multicast packets to additional end users. MP2MP LSPs are more vulnerable to this problem due to the upstream path forwarding. Communication system 10 solves the upstream path loop dilemma, as outlined below.

In operation of an example embodiment, R7 constructs an MP2MP LSP to the root via R4, R2, and R1. R5 constructs the MP2MP to the root via R2 and R1. If Link A 30 (between R1 and R2) breaks, R2 will converge and change the upstream path of the MP2MP to R5. R5 will respond by changing its path upstream to R7. If R7 and R4 have not converged yet, a micro-loop has been created. Packets that are inserted via R5 or R7 will loop via R7, R4, R2, R5, which is a problematic issue.

For P2MP trees, there is typically only one injection point into the tree: from the root, down to the receivers. Thus, once the loop is formed, it can block new packets from entering the loop. Packets propagating through the loop will continue to do so until they expire. For MP2MP trees, there can be multiple senders into the tree because each of the leaves can inject packets into the tree. This means that if a loop is formed in the upstream path of a tree, other injection points may be involved in this loop, which compounds the problem.

To solve this problem, some modifications to mLDP can be made to detect loops (e.g., in the upstream path) and to prevent them from infecting the forwarding operations. Note that many protocols build their respective trees from a receiver. For example, if a receiver wants to join a tree, it sends a label mapping to the root of the tree. For MP2MP, the label mapping is bi-directional, which means that for each link (between two LDP pairs), there are two label mappings (one going up and one going down).

The present architecture can apply two changes to the MP2MP setup logic. Currently, the upstream path is established on a hop-by-hop basis. This is changed such that the upstream path is installed when the downstream label-mapping message has reached the root or an intermediate node that has an upstream path. If a tree is sought to be built, and there is a label mapping message sent to a given router, that router will not reply immediately. Instead, that router will send the label-mapping message up the tree toward its root.

Thus, if a branch of the MP2MP LSP is the first to join, the downstream label mappings will go all the way up to the root, and then the label mapping for the upstream paths will be triggered from the root to the downstream leafs. When the label mapping reaches the root of the tree (or a router that already has state information), the reply is sent back.

While these operations occur, a second change is applied such that paths vectors are added to the label mapping for the upstream paths. Once the path is created from the root down to the receivers, path vectors are being added to the label mapping. This is something that can be defined in LDP. Thus, each hop that is visited along the path (from the root to the receiver [and all intermediate nodes along that path]) is included in the label mapping or path vector. Thus, it can be readily seen which routers are in the path from the receiver toward the root. Moreover, the path vector is what can be used to detect the loop.

When the label mapping for the upstream path is received from the root, the path vector is evaluated to see if our own address (from the perspective of the router evaluating this path vector) is part of the path vector. If the router is present in that path vector, there is a potential for a loop because the label mapping should not have a path vector that includes the router's own identification (ID) (from the perspective of the router receiving the label mapping) in the path vector. Thus, when this is identified, the router can understand that there is a problem in the network and this label mapping should not be installed (or recorded in its table).

Consider R7, which represents the first leaf to join the MP2MP LSP. Downstream label mappings are triggered from R7-R4-R2-R1-root. Once the root is reached, the label mapping for the upstream paths are sent down to R7 following the same path in the reverse order. R7 will have learned the path to the root via [R4-R2-R1-root]. R5 now joins to the MP2MP LSP and sends a downstream label mapping to R2. Since R2 already has state and an upstream path to reach the root, R2 will immediately reply to R5 with the path [R2-R1-root].

Turning now to the example flow of FIG. 2, FIG. 2 is a simplified flowchart that includes a series of example steps associated with an operation of communication system 10. The illustration of FIG. 2 has been provided for purposes of teaching only and, therefore, should be construed as such.

The flow begins at step 102, where link A 30 breaks and the network gets into the micro-loop scenario explained earlier. At step 104, R2 converges, changes its upstream path, and sends a downstream label mapping to R5. R5 converges its upstream path to R7 at step 106. R7 has not converged and still thinks it has a valid path to reach the root via [R4-R2-R1-root]. At step 108, R7 replies to a communication with an label mapping for the upstream path [including path R4-R2-R1-root] to R5. R5 checks if its own router ID (e.g., the address) is present in the vector path received from R7 at step 110.

At step 112, if R5 is not present in the list, it will install the upstream path to R7. At step 114, R7 will include its own router ID in the path vector and send an label mapping for the upstream path to R2. At step 116, R2 checks if its own router ID is present in the path vector. Since the R2 does appear in the path vector in this example, the upstream path to R5 is not installed.

Stated more specifically, the first label mapping that is received is the label mapping for the downstream path. This downstream path is not installed into forwarding until the label mapping for the upstream path is received. The upstream path is also a path that is installed into forwarding. Once the first router detects that it is not in the path vector of the label mapping for the upstream path, two forwarding entries can be programmed: the downstream path and the upstream path. Both of these entries are significant in preventing a possible loop.

R2 will retain the label value, but will not install it in label forwarding table. It is also possible that R5 has not converged yet when it receives the downstream label mapping from R2. R5 thinks it has a valid path to reach the root via [R2-R1-root]. It will reply to R2 including this path. R2 will then also detect that it appears in the path vector and will not install the label in the forwarding table.

At step 118, if R7 later converges to the new path via [R6-R3-R1-root], it will refresh the path vectors downstream from it. If a downstream router detects that it is not on the path vector list anymore, it can safely install the label in its forwarding table.

Note that inherent in these operations is that the leaf should know the full path before installing the label mapping. The only way to ensure this condition is to make sure that the label mapping goes all the way up to the root. Vectors are then added to the path and then the label mapping goes back down and, thereby, records all the hops along this vector path. If instead this were performed on a crude hop-by-hop basis, then the full path would not be known.

If there is a failure or a problem with a link (e.g., near the root), all of the leaves would need to be informed (via an update) that the path to the root has changed. Therefore, label-mapping updates are necessary to inform the leaves of changes to specific path vectors. For many routers, the label does not change any forwarding activities (i.e., perhaps the change occurred much further upstream from the root) and, hence, only the path vector would need to be changed.

Note that LDP distributes labels for forwarding equivalence classes (FEC). LDP uses FEC type, length, values (TLVs) in LDP messages to specify FECs. An LDP FEC TLV includes one or more FEC elements. A FEC element includes an FEC type and an optional type-dependent value.

Due to scalability concerns, the present architecture can send the path vector changes on a FEC basis (not on an individual LSP basis). Thus, the architecture can send a label mapping for a path vector with a wildcard FEC, which indicates that this label mapping applies to all FECs of a particular type (e.g., per root). Where there are LSPs that share the same root, then the path vector can be updated for all of them with a single mapping.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 2 illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges involving routing protocols (e.g., IGP, OSPF, IS-IS, etc.), communication system 10 may be applicable to other exchanges, routing protocols, or routed protocols in which packets (not necessarily the routing protocol packets described) are exchanged in order to provide routing updates, topology information, label data, or awareness information. For example, communication system 10 could readily be implemented in conjunction with any: 1) non-stop forwarding (NSF) protocol; 2) border gateway protocol (BGP); 3) optimized link state routing (OLSR); 4) express forwarding (EF) protocol; and 5) stateful switch over (SSO) protocol.

Moreover, communication system 10 may be applicable to any suitable element or component within the network that seeks to identify an optimal set of routing paths and become aware of its neighboring devices through any communications protocol. Thus, any application where there is a need to communicate mapping, label, or state information may benefit from the teachings of communication system 10. In addition, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:

receiving a downstream label mapping at a first router;

sending a message associated with the downstream label mapping toward a root router of a Multipoint Label Switched Path (MPLSP) in a network, without installing the downstream label mapping in the first router;

evaluating an upstream label mapping to identify whether an address of the first router is part of a path vector associated with the upstream label mapping;

installing the downstream label mapping and the upstream label mapping in the first router only if the path vector does not include the address of the first router; and adding the path vector to at least one multicast label distribution protocol (mLDP) upstream path label mapping, wherein if the address of the first router is not part of the path vector, the upstream label mapping associated with the path vector is recorded in a table of the first router; and wherein the path vector is associated with forwarding equivalence classes (FEC) and path vector changes are distributed on a FEC basis, and wherein the upstream label mapping associated with the path vector includes a wildcard FEC which indicates that the upstream label mapping changes apply to all FECs of a particular root of the path vector.

2. The method of claim 1, wherein the first router identifies that if the address of the first router is part of the path vector, a loop is present in the network.

3. The method of claim 1, wherein once a path is created from the root router down to one or more receiving routers, path vectors are added to a label mapping message sent by the root router as it propagates from one or more of the receiving routers.

4. The method of claim 1, wherein the first router implements a communications protocol that is selected from the group consisting of:

a) non-stop forwarding (NSF) protocol;

b) border gateway protocol (BGP);

c) multi-protocol label switching (MPLS) protocol;

d) intermediate system-to-intermediate system (IS-IS) protocol;

e) optimized link state routing (OLSR);

f) express forwarding (EF) protocol;

g) open shortest path first (OSPF) protocol; and h) stateful switch over (SSO) protocol.

5. An apparatus, comprising:

a first router receiving a downstream label mapping, wherein the first router sends a message associated with the downstream label mapping toward a root router of a Multipoint Label Switched Path (MPLSP) in a network without installing the downstream label mapping, the first router evaluating an upstream label mapping to identify whether an address of the first router is part of a path vector associated with the upstream label mapping, and installing the downstream label mapping and the upstream label mapping only if the path vector does not include the address of the first router; and wherein the path vector is added to at least one multicast label distribution protocol (mLDP) upstream path label mapping, wherein if the address of the first router is not part of the path vector, the upstream label mapping associated with the path vector is recorded in a table of the first router; and wherein the path vector is associated with forwarding equivalence classes (FEC) and path vector changes are distributed on a FEC basis, and wherein the upstream label mapping associated with the path vector includes a wildcard FEC which indicates that the upstream label mapping changes apply to all FECs of a particular root of the path vector.

6. The apparatus of claim 5, wherein the first router identifies that if the address of the first router is part of the path vector, a loop is present in the network.

7. The apparatus of claim 5, wherein once a path is created from the root router down to one or more receiving routers, path vectors are added to a label mapping message sent by the root router as it propagates from one or more of the receiving routers.

8. Logic that represents a non-transitory computer-readable medium for execution and when executed by a processor operable to:

receive a downstream label mapping at a first router;

send a message associated with the downstream label mapping toward a root router of a Multipoint Label Switched Path (MPLSP) in a network, without installing the downstream label mapping in the first router;

evaluate an upstream label mapping to identify whether an address of the first router is part of a path vector associated with the upstream label mapping;

install the downstream label mapping and the upstream label mapping in the first router only if the path vector does not include the address of the first router; and wherein once a path is created from the root router down to one or more receiving routers, path vectors are added to a label mapping message sent by the root router as it propagates from one or more of the receiving routers, and wherein the addition of the path vectors are defined in a label distribution protocol (LDP), and wherein the path vector is added to at least one multicast label distribution protocol (mLDP) upstream mapping message, wherein if the address of the first router is not part of the path vector, the upstream label mapping associated with the path vector is recorded in a table of the first router; and wherein the path vector is associated with forwarding equivalence classes (FEC) and path vector changes are distributed on a FEC basis, and wherein the upstream label mapping associated with the path vector includes a wildcard FEC which indicates that the upstream label mapping changes apply to all FECs of a particular root of the path vector.

9. The logic of claim 8, wherein the first router identifies that if the address of the first router is part of the path vector, a loop is present in the network.

10. The logic of claim 8, wherein the path vector is associated with forwarding equivalence classes (FEC), and wherein path vector changes are distributed on a FEC basis, and wherein the path vector comprises a wildcard FEC, which indicates that label mapping changes apply to all FECs of a particular root.

11. A system, comprising:

means for receiving a downstream label mapping message at a first router;

means for sending a message associated with the downstream label mapping toward a root router of a Multipoint Label Switched Path (MPLSP) in a network, without installing the downstream label mapping;

means for evaluating an upstream label mapping to identify a loop in the network, wherein a loop in the network is identified if an address of the first router is part of a path vector associated with the upstream label mapping; and means for installing the downstream label mapping and the upstream label mapping in the first router only if the path vector does not include the address of the first router; and means for adding the path vector to at least one multicast label distribution protocol (mLDP) upstream path label mapping; and wherein the path vector is associated with forwarding equivalence classes (FEC) and path vector changes are distributed on a FEC basis, and wherein the upstream label mapping associated with the path vector includes a wildcard FEC which indicates that the upstream label mapping changes apply to all FECs of a particular root of the path vector.

* * * * *